(12) United States Patent
Kelly et al.

(10) Patent No.: US 6,691,216 B2
(45) Date of Patent: Feb. 10, 2004

(54) SHARED PROGRAM MEMORY FOR USE IN MULTICORE DSP DEVICES

(75) Inventors: Kenneth C. Kelly, Richmond, TX (US); Irvinderpal S. Ghai, Missouri City, TX (US); Jay B. Reimer, Houston, TX (US); Tai Huu Nguyen, Houston, TX (US); Harland Glenn Hopkins, Missouri City, TX (US); Yi Luo, Stafford, TX (US); Jason A. T. Jones, Houston, TX (US); Dan K. Bui, Sugarland, TX (US); Patrick J. Smith, Houston, TX (US); Kevin A. McGonagle, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 329 days.

(21) Appl. No.: 10/004,492

(22) Filed: Oct. 24, 2001

(65) Prior Publication Data

US 2002/0056030 A1 May 9, 2002

Related U.S. Application Data

(60) Provisional application No. 60/246,648, filed on Nov. 8, 2000.

(51) Int. Cl.$^7$ ............................................ G06F 15/78
(52) U.S. Cl. .................... 711/167; 711/152; 713/502; 710/305; 709/212
(58) Field of Search ................................ 711/150, 154, 711/167; 365/189.02, 189.04, 189.05, 189.07, 189.08, 194, 220, 221, 233; 713/401, 502; 712/35, 37, 215; 710/23, 25, 28, 45, 61, 117

(56) References Cited

U.S. PATENT DOCUMENTS

| | | | |
|---|---|---|---|
| 4,447,877 A | * | 5/1984 | Grondalski ................. 713/502 |
| 5,659,688 A | | 8/1997 | Nimishakavi et al. |
| 5,838,934 A | * | 11/1998 | Boutaud et al. ............. 710/305 |
| 5,890,013 A | | 3/1999 | Nair et al. |
| 6,058,458 A | | 5/2000 | Lee |
| 2002/0004877 A1 | * | 1/2002 | Boles .......................... 711/102 |
| 2002/0059393 A1 | * | 5/2002 | Reimer et al. .............. 709/212 |
| 2002/0059502 A1 | * | 5/2002 | Reimer et al. .............. 711/152 |
| 2003/0018859 A1 | * | 1/2003 | Smith .......................... 711/152 |

FOREIGN PATENT DOCUMENTS

| | | | | |
|---|---|---|---|---|
| EP | 1 239 374 A1 | * | 9/2002 | ........... G06F/15/78 |
| WO | WO 94 09437 A | | 4/1994 | |

* cited by examiner

*Primary Examiner*—Donald Sparks
*Assistant Examiner*—Christian P. Chace
(74) *Attorney, Agent, or Firm*—Robert D. Marshall, Jr.; W. James Brady, III; Frederick J. Telecky, Jr.

(57) ABSTRACT

A multi-core DSP device includes a shared program memory to eliminate redundancy and thereby reduce the size and power consumption of the DSP device. Because each of the program cores typically executes the same software program, memory requirements may be reduced by having multiple processor cores share only a single copy of the software. Accordingly, a program memory couples to each of the processor cores by a corresponding instruction bus. Preferably the program memory services two or more instruction requests in each clock cycle. Data is preferably stored in separate memory arrays local to the processor core subsystems and accessible by the processor cores via a dedicated data bus. In one specific implementation, the program memory includes a wrapper that can perform one memory access in the first half of each clock cycle and a second memory access in the second half of each clock cycle. A designated set of instruction buses is allowed to arbitrate for only the first access, and the remaining instruction buses are allowed to arbitrate for only the second access. In this manner, a reduction in on-board memory requirements and associated power consumption may be advantageously reduced.

24 Claims, 3 Drawing Sheets

SHARED PROGRAM MEMORY FOR USE IN MULTICORE DSP DEVICES

CROSS-REFERENCE TO RELATED APPLICATIONS

This application claims priority under 35 USC §119(e)(1) of Provisional Application No. 60/246,648, filed Nov. 8, 2000.

STATEMENT REGARDING FEDERALLY SPONSORED RESEARCH OR DEVELOPMENT

Not applicable.

BACKGROUND OF THE INVENTION

The present invention generally relates to digital signal processors. More particularly, the invention relates to memory in digital signal processors. Still more particularly, the invention relates to a program memory that is shared between multiple central processing unit (CPU) cores and that can fetch instructions for multiple CPU cores in the same clock cycle.

Microprocessors generally include a variety of logic circuits fabricated on a single semiconductor chip. Such logic circuits typically include a central processing unit (CPU) core, memory, and numerous other components. Some microprocessors, such as digital signal processors (DSPs) provided by Texas Instruments, may include more than one CPU core on the same chip. For such multi-core DSP devices, typically each CPU core has an associated memory in which it stores data and program instructions. In other words, for every CPU core in a multi-core DSP device, there is a corresponding memory reserved for use by that CPU core.

It is generally desirable for microprocessors such as DSPs to be compact, consume very little power, and generate as little heat as possible. This is especially true for DSPs that reside in small, battery-powered devices such as cellular telephones, pagers, and the like. Accordingly, any improvement in DSP technology that results in smaller and lighter devices that require less power is highly desirable.

BRIEF SUMMARY OF THE INVENTION

The invention disclosed may advantageously provide a compact, low power design by eliminating redundancy of on-board memory in multi-core DSP devices. In one embodiment, the multi-core DSP device has a shared program memory. As each of the program cores may execute the same software program, memory requirements may be reduced by having multiple processor cores share only a single copy of the software. Accordingly, a program memory is coupled to each of the processor cores by a corresponding instruction bus. Preferably the program memory services two or more instruction requests in each clock cycle. Data, however, is preferably stored in separate memory arrays local to the processor core subsystems. The processor cores each access their data via a dedicated data bus.

According to a preferred implementation, the program memory includes a "wrapper" that can perform one memory access in the first half of each clock cycle and a second memory access in the second half of the clock cycle. A designated set of instruction buses is allowed to arbitrate for only the first access, and the remaining instruction buses are allowed to arbitrate for only the second access. In this manner, a reduction in on-board memory requirements and associated power consumption advantageously may be achieved.

BRIEF DESCRIPTION OF THE DRAWINGS

For a detailed description of the preferred embodiments of the invention, reference will now be made to the accompanying drawings in which.

Notation and Nomeenclature

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the present invention is discussed below in the context of a multi-core, fixed-point, digital signal processor (DSP) chip. This embodiment, however, is not intended to limit the scope of this disclosure to this context, rather, the preferred embodiment may have applicability to any multiple core DSP device that would benefit from sharing resources.

Figure 1:
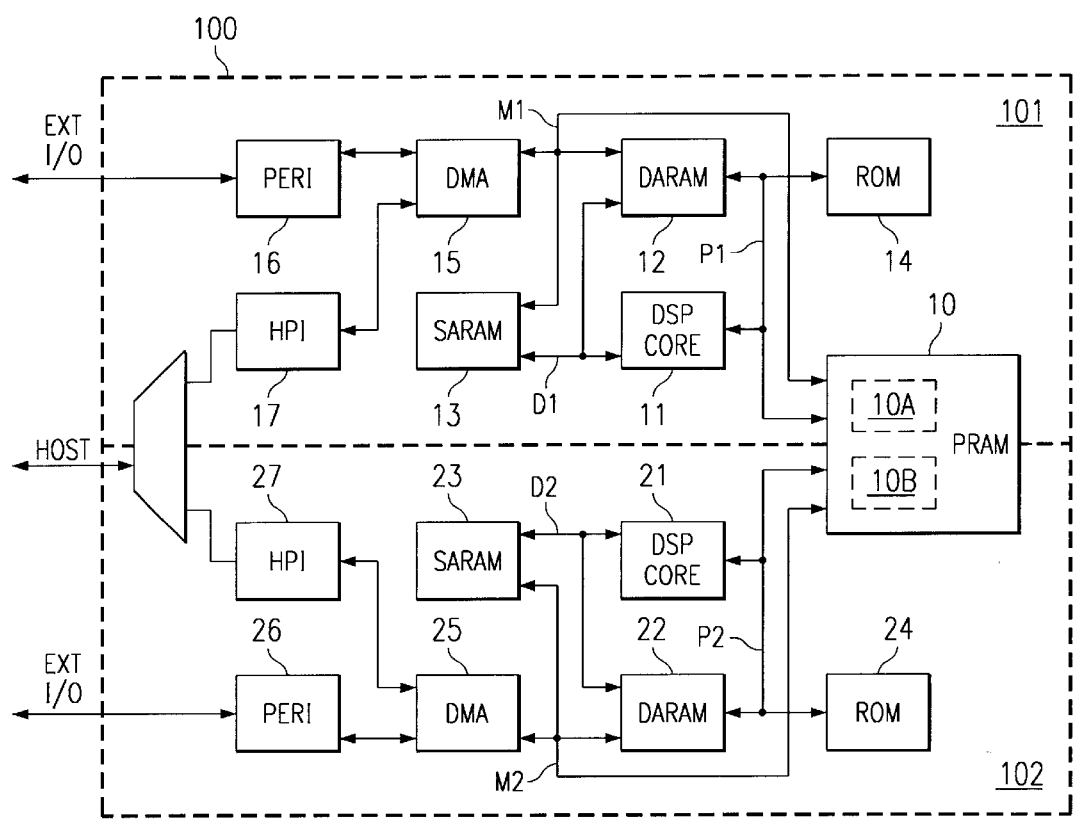
FIG. 1 shows a preferred embodiment of the invention in which two processor cores share one program memory.

Turning now to the figures, FIG. 1 shows a DSP chip 100 that includes multiple DSP subsystems 101, 102, a shared program memory (PRAM) 10, and two host port interfaces (HPI) 17, 27 that allow the DSP 100 to be accessed by a host processor (not shown) or other external device as a memory-mapped peripheral device. The DSP subsystems 101, 102 are preferably capable of core-to-core communications.

Each DSP subsystem 101, 102 (generally separated by the dashed line in FIG. 1) preferably includes a DSP core 11, 21, a dual-access, random access memory (DARAM) 12, 22 for data or software, a single-access, random access memory (SARAM) 13, 23 for data, a read-only memory (ROM) 14, 24 for boot-up, one or more external interfaces 16, 26, direct memory access (DMA) logic (also referred to as a DMA controller) 15, 25, and other miscellaneous support circuitry. The DARAM 12, 22 preferably includes four memory blocks, each of which support two memory accesses per clock cycle. The DARAM 12, 22 is intended primarily for data storage, but may be used to store program instructions as well. A register (not shown) in the DSP core 11, 21 determines whether the DARAM 12, 22 is mapped into program memory space or data memory space. The SARAM 13, 23, preferably also includes four memory blocks, each of which support one memory access per clock cycle. Each SARAM preferably is reserved for data storage.

The shared program memory (PRAM) 10 preferably is reserved for program instructions, and includes 16 blocks of dual-access RAM. Each block comprises 16 kilobytes of storage, although the block size and number of blocks can be varied as desired. The PRAM 10 may be physically implemented in pieces 10A, 10B, with each subsystem having a piece. Each DSP subsystem 101, 102 is preferably capable of executing an instruction fetch from any location in the PRAM 10 during each clock cycle. According to the preferred embodiment, the DSP cores 11, 21 are not permitted to write to the PRAM 10. Instead, the DMA logic 15, 25 stores the software in the PRAM 10. The software may be provided by a host processor via HPI 17, 27.

Referring still to FIG. 1, instruction buses P1, P2 couple together the DSP core 11, 21, the local DARAM 12, 22, the local ROM 14, 24, and the shared PRAM 10. Each DSP core 11, 21 preferably has an associated data bus D1, D2 that facilitates data transfers between the local DSP core 11, 21 and its associated data storage devices DARAM 12, 22 and SARAM 13, 23. Each DSP core 11, 21 preferably retrieves instructions via its associated instruction bus P1, P2 from the PRAM 10. The processor cores 11, 21 concurrently fetch and execute distinct instructions from a single program stored in the PRAM 10, and the order in which program instructions are executed by a processor core depends on the data on which the processor core operates. For example, the data on which the cores operate may represent telephone communications. Each core could be responsible for a different set of channels, and as those channels independently initiate and terminate communications, the processors will independently execute the appropriate software instructions. The data will determine the order in which instructions are executed.

Each DMA logic 15, 25 moves data and instructions to and from local data storage devices and to shared PRAM 10 via associated memory buses M1, M2. Each DMA logic 15, 25 also couples to various external interfaces 16, 26, and to host processor interfaces 17, 27. The HPI 17, 27, allows an external host processor to access all internal memory via DMA logic 15, 25.

To keep the overall system design simple, the host processor interface 17, 27 is designed to mimic a memory interface. That is, the host processor can "view" the contents of any memory location internal to the DSP 100 and many of the DSP core registers by sending an address to the HPI 17, 27 indicating the desired location. One of the HPIs 17, 27, causes the associated DMA logic 15, 25 to retrieve the desired information, and then provides the information as data in the same way that a memory device would. The HPI 17, 27 preferably acts as a slave device to the host processor, but generates a signal to the host processor to stall the host processor during an access if the DMA logic 15, 25 is busy with other tasks.

External interface ports 16, 26 preferably each include one or more multi-channel serial interfaces. The multi-channel serial ports provide high-speed, full-duplex, double-buffered serial communications for direct interfacing with other DSP chips. The configuration of these ports is preferably programmable by a host computer to allow direct interfacing with existing standard protocols. Each port 16, 26 preferably supports multi-channel transmit and receive of up to 128 channels. The multi-channel serial ports perform time division multiplexing and de-multiplexing when multiple channels are enabled. Each data frame that is sent or received represents a time-division multiplexed (TDM) data stream, so that the content of one channel is interleaved with the contents of the other channels.

The DMA controllers 15, 25 perform data transfers independent of the DSP cores 11, 21. The DMA controllers control access to internal memory (PRAM 10, DARAM 12, 22, and SARAM 13, 23) and to external I/O and memory (via external interfaces 16, 26). The DMA controllers 15, 25 can perform background movement of data between internal memory, external memory, and internal peripherals such as the serial ports 16, 26 and HPIs 17, 27. Each DMA controller preferably provides multiple "channels" for the independent, concurrent management of multiple block transfers. DMA transfers are accomplished by first reading the data into memory internal to the DMA controller, and then writing the data from the DMA controller memory to the desired destination. When DSP core memory accesses to internal memory conflict with DMA controller accesses, the DMA controller accesses preferably are given higher priority. The M1 and M2 buses are coupled by a bus interface (not shown) so that the DSP cores can communicate by DMA data transfers between local data memories (DARAM 12, 22 or SARAM 13, 23).

Figure 2A:
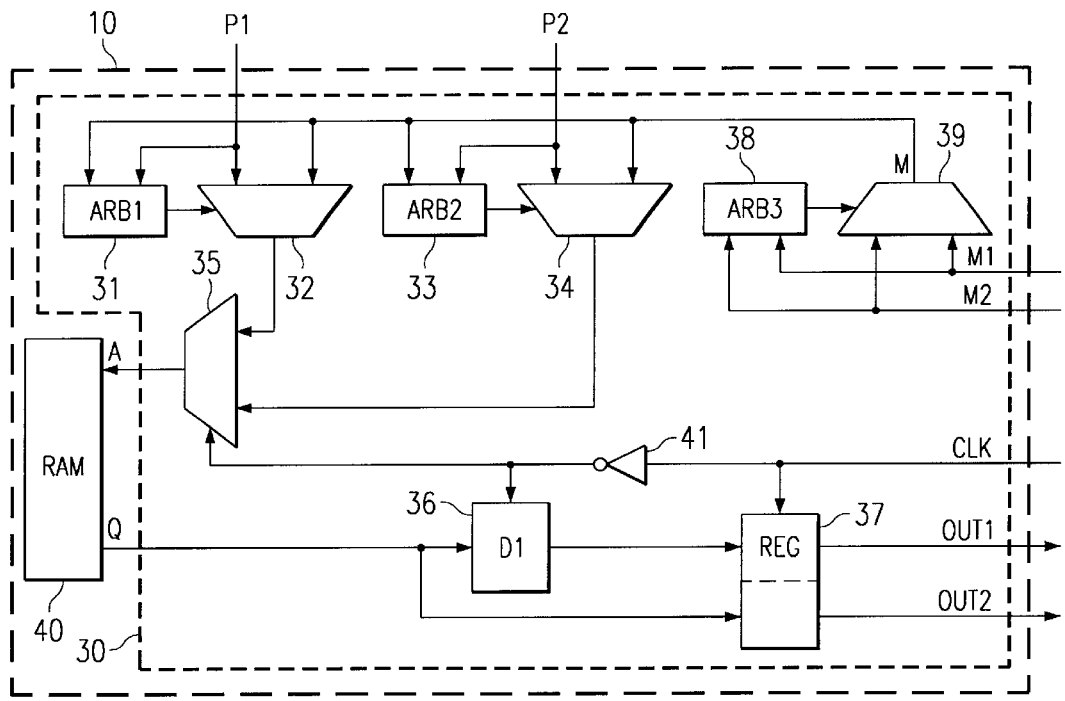
FIG. 2A shows one embodiment of a shared program memory wrapper.

Turning now to FIG. 2A, the shared PRAM 10 preferably includes a random access memory (RAM) 40 having a memory array and well-known supporting circuitry such as address decoders and read/write circuitry (not specifically shown). In addition, the PRAM 10 preferably includes a memory "wrapper" 30 as shown in FIG. 2A. The memory wrapper 30 comprises the supporting circuitry that provides the RAM 40 with the desired functionality of permitting multiple DSP core accesses in the same clock cycle. Wrapper 30 includes a first arbitration unit 31 with an associated multiplexer 32, a second arbitration unit 33 with its associated multiplexer 34, a third arbitration unit 38 with its associated multiplexer 39, a time division multiplexer 35, a delay latch 36, and an output register 37.

In the embodiment of FIGS. 1 and 2A, the DSP chip 100 includes only two DSP subsystems 101, 102. As one skilled in the art will appreciate, there may be more than two DSP subsystems, each having a corresponding processor core. The DSP subsystems will be separated into two sets. For the current discussion, the first set consists of subsystem 101, and the second set consists of subsystem 102. Instruction buses from processor cores in the first set (P1) couple to the first arbitration unit 31, and the instruction buses from processor cores in the second set (P2) couple to the second arbitration unit 33. The memory buses M1, M2 from all subsystems are coupled to both arbitration units 31, 33 via the third arbitration unit 38 and associated multiplexer 39.

Each arbitration unit 31, 33, 38 receives requests for access to RAM 40. If more than one request is received by an arbitration unit, that unit will select one of the requests and stall the rest. In resolving conflicts, arbitration units 31, 33 preferably give priority to access requests from the moemory buses M1, M2. DMA read requests are serviced only by the first arbitration unit 31, and DMA write requests are serviced only by the second arbitration unit 33. Only one memory bus M1 or M2 is granted access by arbitration unit 38 in a given cycle. If at least one request is received by an arbitration unit, the arbitration unit sets the associated multiplexer 32, 34, 39 to pass the selected request onward.

The time division multiplexer 35 receives the access requests selected by the arbitration units 31, 33. An inverter 41 receives and inverts a clock signal. The clock signal (CLK) may be generated elsewhere in DSP 100 via clock generation circuitry not specifically shown in FIG. 1. The inverted clock signal functions as the select signal for the time division multiplexer 35. When the inverted clock signal is low the time division multiplexer 35 forwards the memory access selected by the first arbitration unit 31 to the RAM 40. The forwarded memory access includes address A as shown.

During this first half-cycle of the clock, the RAM 40 services the access request and provides any output Q to delay register 36. A positive-going (i.e., low to high) transition of the inverted clock signal causes the delay register 36 to latch and forward the output value to the output register 37. While the inverted clock signal is high, the time division multiplexer 35 forwards the memory access selected by the second arbitration unit 33 to RAM 40, which services the access request and provides any output Q to output register 37. A positive-going transition of the non-inverted clock signal causes the output register 37 to latch and forward the output Q of the RAM 40 and the output of the delay register 36. In this manner, two processor cores can independently retrieve program instructions from the shared PRAM 10 in one clock cycle.

In systems with more than two processor cores, one or more of the processor cores' instruction buses may be coupled to the first arbitration unit 31, and the remaining processor cores' instruction buses may be coupled to the second arbitration unit 33. The processor cores having memory access requests that are not granted during the current clock cycle preferably are forced to wait at least until the next clock cycle to have their accesses serviced. These requesters may be stalled by holding a commonly known bus acknowledge signal low until the request is serviced. Preferably, access conflicts between processor cores cause arbitration priorities to shift in a systematic fashion to prevent discrimination against any one processor core. It is preferred to give the memory bus accesses the highest priority at all times to avoid stalling DMA transfers. Typically, DMA accesses to the shared PRAM 10 are performed only during initial program load as explained above. During normal operation, these accesses would typically not occur.

It is noted that when coupling processor cores to arbitration units, it may be desirable to couple the cores that are physically furthest away from the PRAM to the second arbitration unit 33. Since accesses made via arbitration unit 33 are performed in the second half of the clock cycle, this will allow more time for signal propagation from the more distant processor cores, thereby somewhat easing timing constraints.

Figure 3:
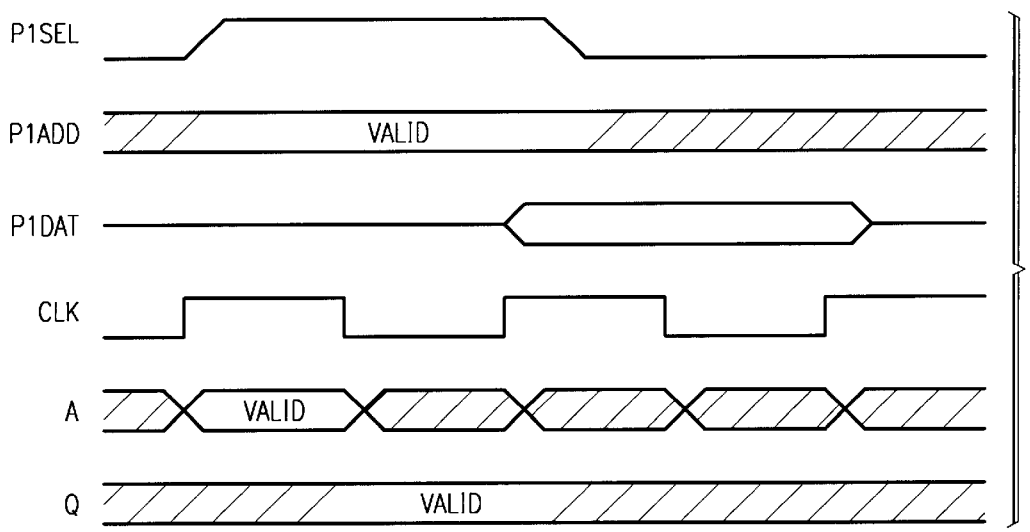
FIGS. 3 and 4 show timing diagrams illustrating how two memory accesses may be serviced in a single clock cycle.
Figure 4:
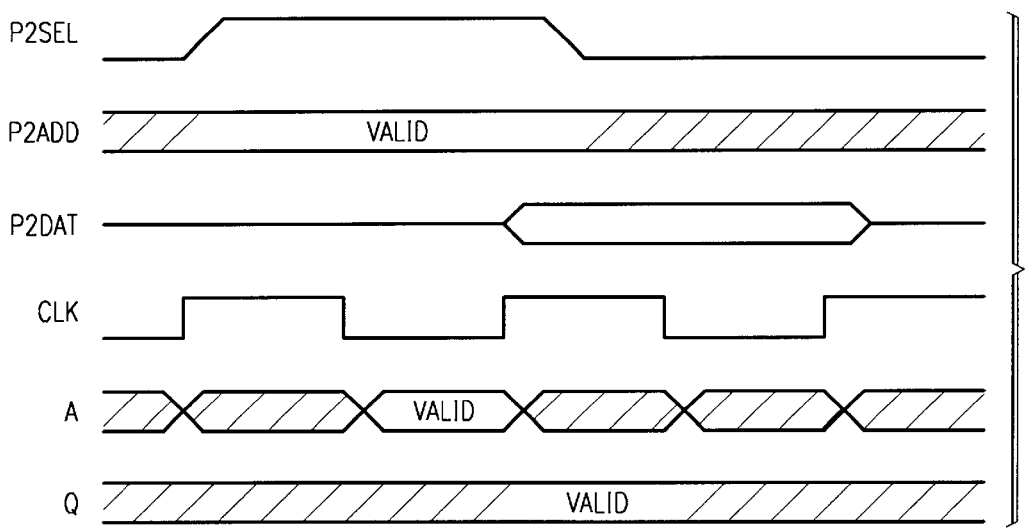

FIGS. 3 and 4 illustrate the signal timing on the instruction buses P1 and P2 and in the memory wrapper 30. The processor cores 11, 21 request memory accesses by asserting the selection signals P1SEL, P2SEL of the instruction buses P1, P2, and providing the desired instruction address on their corresponding instruction buses P1, P2. The memory wrapper 30 forwards the P1 instruction bus address P1ADD as address A to the RAM 40 during the first half of the clock cycle, and forwards the P2 instruction bus address P2ADD as address A to the RAM 40 during the second half of the clock cycle. (Compare FIGS. 3 and 4). The output data Q requested on instruction bus P1 is supplied by the RAM 40 to the wrapper 30 during the second half of the clock cycle, and the output data Q requested by instruction bus P2 is supplied after the second half of the clock cycle (beginning of the next clock cycle). The output data Q is latched as P1DAT and P2DAT, and held by the wrapper 30 for a complete clock cycle before being forwarded to the individual processor cores 11, 21.

Figure 2B:
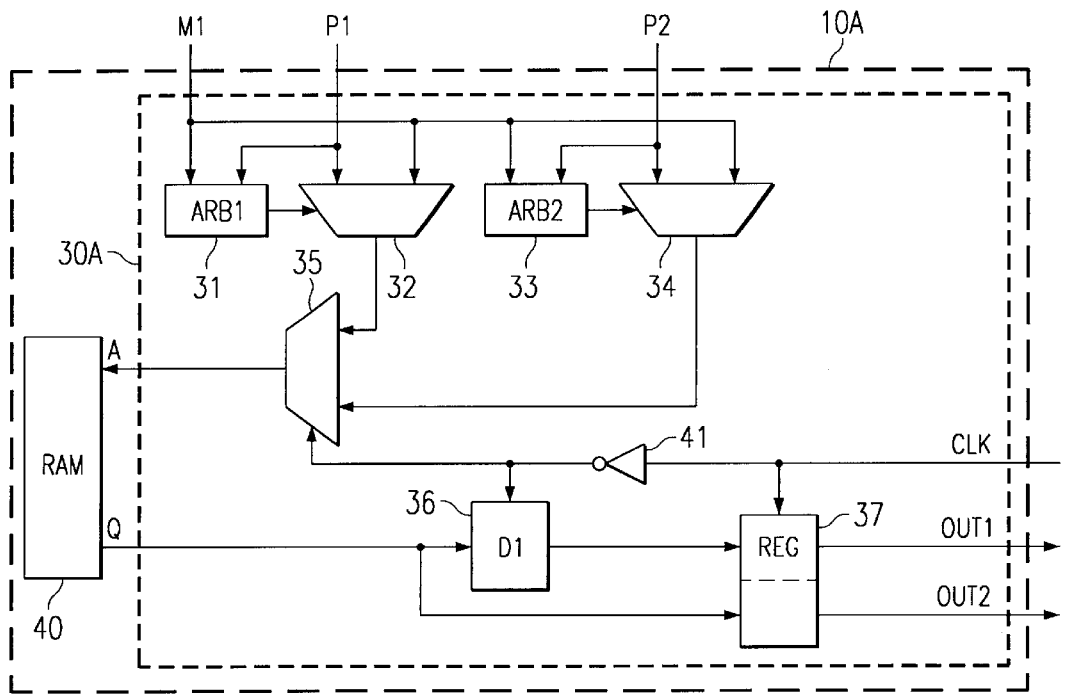
FIG. 2B shows an alternate embodiment of a shared program memory wrapper.

FIG. 2B shows an alternate embodiment in which a memory wrapper 30A is provided for only a portion 10A of shared program memory 10. The other portion 10B has a similar memory wrapper. Components numbered identically to those in FIG. 2B perform similar functions. Note that only the local memory bus M1 is coupled to portion 10A, so that memory wrapper 30A does not require a third arbiter to arbitrate between memory buses M1 and M2. Portion 10B will be similarly coupled to memory bus M2. In digital signal processor systems having more processor subsystems, the shared program memory may be implemented in more portions, and each portion will be coupled to the local memory bus.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A digital signal processing system that comprises:
   a shared program memory;
   a plurality of processor subsystems that each include:
      a processor core;
      an instruction bus that couples the processor core to the shared program memory, wherein the shared program memory is configured to service multiple instruction requests received via the instruction buses in each clock cycle.

2. The system of claim 1, wherein the shared program memory and the plurality of processor subsystems are fabricated on a single chip.

3. The system of claim 1, wherein the shared program memory includes:
   a memory array; and
   a memory wrapper coupled to the memory array, wherein the memory wrapper includes:
      a time division multiplexer configured to receive two instruction requests in each clock cycle, wherein the time division multiplexer is configured to forward a first of the two instruction requests to the memory array during a first half-cycle of the clock cycle, and is configured to forward a second of the two instruction requests to the memory array during a second half-cycle of the clock cycle.

4. The system of claim 3, wherein the memory wrapper further includes:
   a delay latch coupled to the memory array and configured to latch results of the first instruction request to provide a delayed memory array output;
   an output latch coupled to the delay latch and to the memory array, wherein the output latch is configured to simultaneously latch results of the second instruction request and the delayed memory array output.

5. The system of claim 3, wherein the memory wrapper further includes:
   a first arbitration unit and a first multiplexer each coupled to a first one of said instruction buses, wherein the first arbitration unit is configured to select an access request and configured to control the first multiplexer to forward a selected access request to the time division multiplexer as the first of the two instruction requests; and
   a second arbitration unit and a second multiplexer each coupled to a second, different one of said instruction buses, wherein the second arbitration unit is configured to select an access request and configured to control the second multiplexer to forward a selected access request to the time division multiplexer as the second of the two instruction requests.

6. The system of claim 5, wherein the processor subsystems each further include:

data memory coupled to the processor core via a data bus distinct from the instruction bus, wherein the processor core is configured to operate on data from the data memory in accordance with program instruction retrieved via the instruction bus.

7. The system of claim 6, wherein the processor subsystems each further include:

a direct memory access (DMA) controller; and a memory bus that couples the DMA controller to the data memory and the shared program memory, wherein the memory bus is distinct from the instruction bus and distinct from the data bus.

8. The system of claim 7, wherein the memory wrapper further includes:

a third arbitration unit and a third multiplexer each coupled to all of the instruction buses, wherein the third arbitration unit is configured to select an access request received via the instruction buses and configured to control the third multiplexer to forward a selected access request to the first and second arbitration units.

9. The system of claim 8, wherein the first arbitration unit selects the access request received from the third multiplexer only if the access request is a read request, and wherein the second arbitration unit selects the access request received from the third multiplexer only if the access request is a write request.

10. The system of claim 9, wherein the first and second arbitration units grant priority to access requests received from the third multiplexer.

11. The system of claim 1, wherein the processor cores are configured to concurrently execute distinct instructions from a single program stored in the shared program memory, and wherein the order in which program instructions are executed by a processor core depends on the data that the processor core operates on.

12. The system of claim 1, further comprising:

a separate dual access data memory for each processor subsystem, wherein each dual access data memory is coupled to the processor core via a data bus distinct from the instruction bus, wherein the processor subsystem's processor core is configured to operate on data from the data memory in accordance with program instruction retrieved via the instruction bus.

13. The system of claim 1, further comprising:

a separate boot ROM for each processor subsystem, wherein each boot ROM is coupled to the processor core via the instruction bus.

14. The system of claim 7, further comprising:

a separate external access port for each processor subsystem, wherein each external access port is coupled to the processor subsystem's DMA controller.

15. The system of claim 7, further comprising:

a host port multiplexer;

a separate host port interface for each processor subsystem, wherein each host port interface is coupled to the processor subsystem's DMA controller, and wherein each host port interface is configured to communicate with a host processor via the host port multiplexer.

16. A method of reducing on-board memory requirements of a multi-core processor chip, wherein the method comprises a memory wrapper:

receiving in a clock cycle one or more access requests from a first set of instruction buses associated with a first set of processor cores;

receiving in the clock cycle one or more access requests from a second set of instruction buses associated with a second set of processor cores, wherein the first set of instruction buses is disjoint from the second set of instruction buses;

accessing in a first half of the clock cycle a program memory to service an access request from one of the first set of instruction buses; and accessing in a second half of the clock cycle a program memory to service an access request from one of the second set of instruction buses.

17. The method of claim 16, further comprising the memory wrapper:

arbitrating between access requests from the first set of instruction buses to determine a first selected access request for service in said clock cycle; and arbitrating between access requests from the second set of instruction buses to determine a second selected access request for service in said clock cycle.

18. The method of claim 17, further comprising the memory wrapper:

latching results of the first selected access request; and subsequently latching the latched results of the first selected access request and simultaneously latching results of the second access request.

19. The method of claim 16, further comprising:

the first and second set of processor cores concurrently executing distinct instructions from a single program stored in the shared program memory, wherein the order in which program instructions are executed by a processor core depends on the data that the processor core operates on.

20. A digital signal processor chip that comprises:

a program memory; and a plurality of processor cores coupled to the program memory via a corresponding plurality of instruction buses, wherein the processor cores are configured to independently retrieve and execute instructions from the program memory, wherein multiple processor cores retrieve instructions from the program memory in a given clock cycle.

21. The chip of claim 20, wherein the program memory includes a wrapper configured to service two access requests to the program memory in each clock cycle.

22. The chip of claim 21, wherein the wrapper is configured to receive a first set of access requests and a second, different set of access requests each clock cycle, and wherein the wrapper services the first set of access requests by accessing memory during a first half of the clock cycle and services the second set of access requests by accessing memory during a second half of the clock cycle.

23. The chip of claim 22, wherein the first set of access requests includes all of a first processor core's access requests to the program memory, and the second set of access requests includes all of a second processor core's access requests to the program memory.

24. The chip of claim 22, wherein the first set includes access requests from a designated set of instruction buses, and wherein the second set includes access requests from a second, disjoint set of instruction buses.

* * * * *